US012766739B2

(12) United States Patent
Tokairin

(10) Patent No.: US 12,766,739 B2
(45) Date of Patent: Oct. 20, 2026

(54) PROCESSING SYSTEM

(71) Applicant: Tokyo Electron Limited, Tokyo (JP)

(72) Inventor: Kento Tokairin, Kurokawa-gun (JP)

(73) Assignee: Tokyo Electron Limited, Tokyo (JP)

( * ) Notice: Subject to any disclaimer, the term of this patent is extended or adjusted under 35 U.S.C. 154(b) by 372 days.

(21) Appl. No.: 18/624,410

(22) Filed: Apr. 2, 2024

(65) Prior Publication Data

US 2024/0342922 A1 Oct. 17, 2024

(30) Foreign Application Priority Data

Apr. 14, 2023 (JP) ................................ 2023-066633

(51) Int. Cl.

*B25J 13/08* (2006.01)
*B25J 9/16* (2006.01)
*B25J 11/00* (2006.01)
*B25J 15/00* (2006.01)
*B25J 15/06* (2006.01)

(52) U.S. Cl.

CPC ........... *B25J 13/082* (2013.01); *B25J 9/1612* (2013.01); *B25J 11/0095* (2013.01); *B25J 15/0014* (2013.01); *B25J 15/0616* (2013.01)

(58) Field of Classification Search

CPC .... B25J 13/082; B25J 9/1612; B25J 11/0095; B25J 15/0014; B25J 15/0616

See application file for complete search history.

(56) References Cited

U.S. PATENT DOCUMENTS

| | | | | |
|---|---|---|---|---|
| 6,454,332 B1 * | 9/2002 | Govzman | H10P 72/53 294/185 |
| 2006/0112978 A1 * | 6/2006 | Jegal | H10P 70/20 134/76 |
| 2008/0193262 A1 * | 8/2008 | Tsuji | H05K 13/0061 414/800 |
| 2011/0111601 A1 * | 5/2011 | Okita | H01J 37/32431 156/345.24 |
| 2015/0083786 A1 * | 3/2015 | Okamoto | B23K 37/04 228/9 |
| 2021/0366747 A1 * | 11/2021 | Kodama | B25J 13/082 |

FOREIGN PATENT DOCUMENTS

JP 2014-135390 A 7/2014

* cited by examiner

*Primary Examiner* — Abby Lin
*Assistant Examiner* — Danielle M Jackson
(74) *Attorney, Agent, or Firm* — Studebaker Brackett PLLC

(57) ABSTRACT

A disclosed processing system includes a substrate placing stage, at least one measurer, and a determiner. The substrate placing stage is configured to place a substrate transferred by a transfer device thereon. The at least one measurer measures a load applied to the substrate placing stage from the substrate when the substrate is transferred from the transfer device onto the substrate placing stage. The determiner determines a suitability of a fixed state of the substrate to the transfer device based on the load measured by the at least one measurer.

14 Claims, 8 Drawing Sheets

PROCESSING SYSTEM

CROSS-REFERENCE TO RELATED APPLICATIONS

This application is based upon and claims the benefit of priority from Japanese Patent Application No. 2023-066633, filed on Apr. 14, 2023, the entire contents of which are incorporated herein by reference.

BACKGROUND

Field

The present disclosure relates to a processing system.

Description of the Related Art

A substrate transfer device is used in processing of placing a substrate on a substrate placing stage. A substrate transfer device disclosed in Japanese Unexamined Patent Publication No. 2014-135390 includes an arm and a suction pad. The suction pad is provided on the arm and holds the substrate. The substrate transfer device controls generation of a negative pressure by the suction pad when the substrate is placed on the substrate placing stage by the arm.

SUMMARY

Disclosed herein is a processing system. The processing system may include a substrate placing stage, at least one measurer, and a determiner. The substrate placing stage is configured to place a substrate transferred by a transfer device thereon. The at least one measurer measures a load applied to the substrate placing stage from the substrate when the substrate is transferred from the transfer device onto the substrate placing stage. The determiner determines a suitability of a fixed state of the substrate to the transfer device based on the load measured by the at least one measurer.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

DETAILED DESCRIPTION

Figure 1:
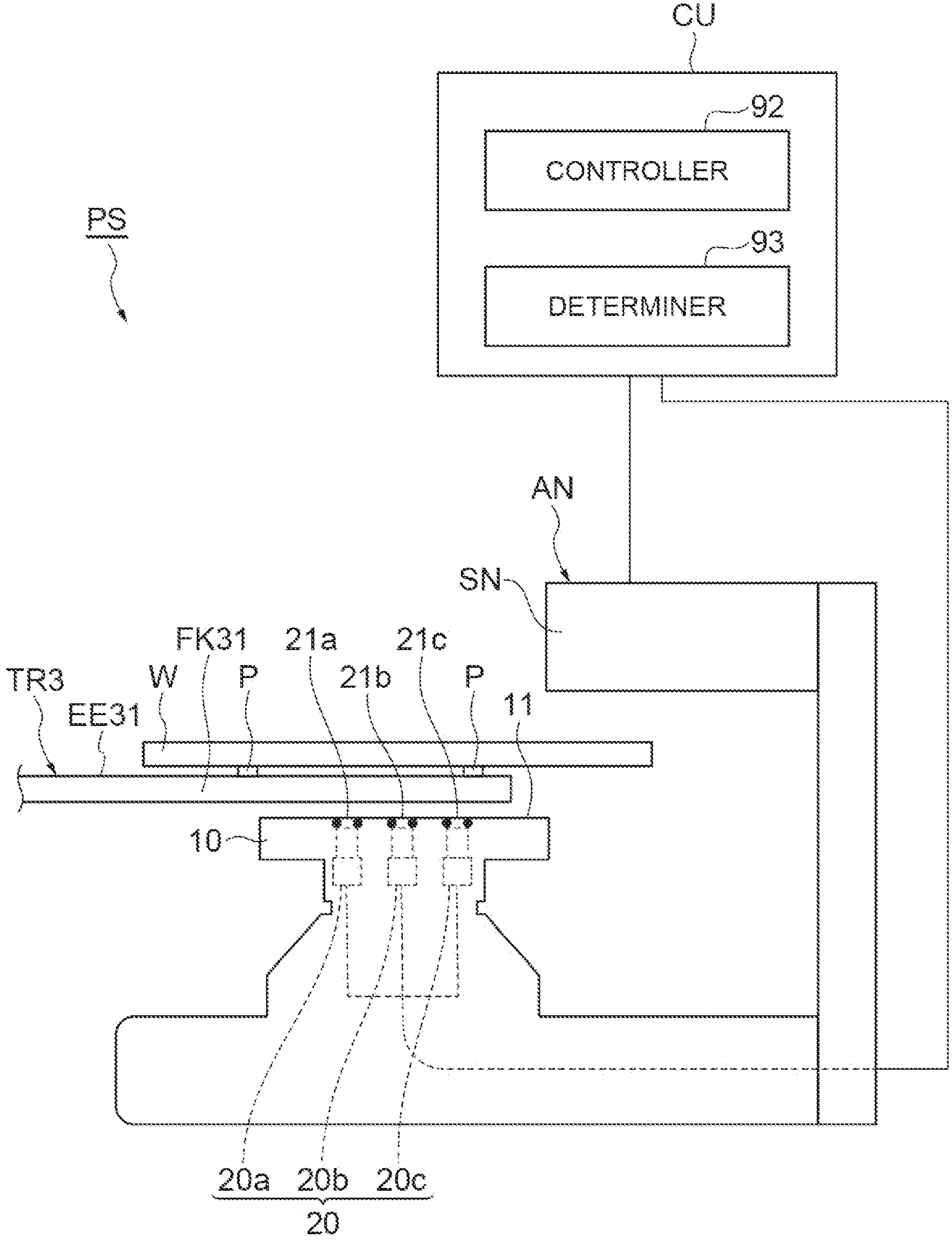
FIG. 1 is a side view illustrating a processing system according to an example . . . .

Hereinafter, various exemplary embodiments will be described in detail with reference to the drawings. In the drawings, the same or equivalent portions are denoted by the same reference symbols.

[Processing System]

With reference to FIG. 1, an example of a processing system according to an exemplary embodiment will be described. FIG. 1 is a side view illustrating a processing system according to an exemplary embodiment. A processing system PS is a system configured to determine whether or not a fixing force of a substrate W to a transfer robot TR3 is abnormal. The substrate W is, for example, a wafer. The processing system PS includes a substrate placing stage 10, at least one measurer 20, and a control device CU. The processing system PS further includes a transfer robot TR3. The transfer robot TR3 is an example of a transfer device.

Figure 2:
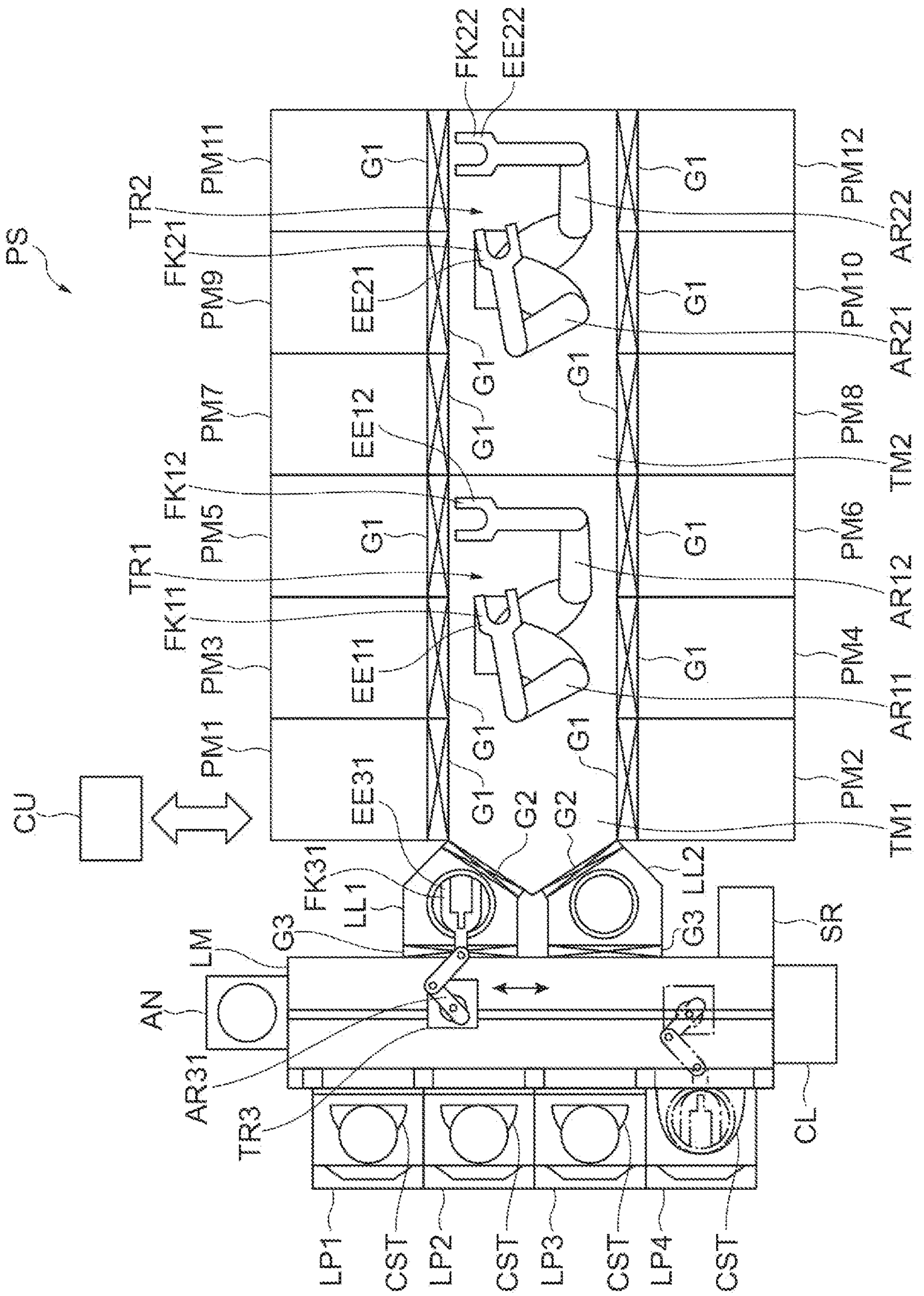
FIG. 2 is a diagram illustrating the processing system according to the example.

FIG. 2 is a diagram illustrating the processing system according to the exemplary embodiment. As illustrated in FIG. 2, the processing system PS is a system capable of performing various types of processing such as plasma processing on the substrate W. As illustrated in FIG. 2, the processing system PS may further include load ports LP1 to LP4, a loader module LM, an aligner AN, load lock modules LL1 and LL2, and a storage SR. The processing system PS may further include a cleaning station CL. The processing system PS may further include transfer modules TM1 and TM2, process modules PM1 to PM12, and the like. In the processing system PS in the exemplary embodiment, the substrate placing stage 10 and the at least one measurer 20 are in the aligner AN.

In the processing system PS illustrated in FIG. 2, the loader module LM is configured to transfer the substrate taken out from any one of the load ports LP1 to LP4 in an atmospheric pressure environment. The loader module LM includes a chamber. A pressure in the chamber of the loader module LM is set to an atmospheric pressure. The loader module LM may have a fan filter unit (FFU). The loader module LM is, for example, an equipment front end module (EFEM). The loader module LM is disposed between each of the load ports LP1 to LP4 and each of the load lock modules LL1 and LL2. The load ports LP1 to LP4 are arranged along one of a pair of edge portions of the loader module LM in a longitudinal direction. The load lock modules LL1 and LL2 are arranged along the other of the pair of edge portions of the loader module LM along the longitudinal direction. Each of the load ports LP1 to LP4 is configured to support a cassette CST placed thereon. The cassette CST is a container that accommodates a plurality of substrates therein. The cassette CST is, for example, a front-opening unified pod (FOUP).

The loader module LM further includes the transfer robot TR3. The transfer robot TR3 is provided in the chamber of the loader module LM. The transfer robot TR3 has, for example, an end effector EE31. The transfer robot TR3 may have an articulated arm AR31. The transfer robot TR3 transfers the substrate based on an operation instruction output by the control device CU described later. The transfer robot TR3 transfers the substrate between any two of the cassette CST which is placed on at least one of the load ports LP1 to LP4, the load lock modules LL1 and LL2, the aligner AN, and the storage SR.

The aligner AN is connected to the loader module LM and is configured to adjust a position of the substrate. The aligner AN is disposed along one of a pair of edge portions of the loader module LM along a transverse direction. The aligner AN may be disposed along the edge portion of the loader module LM along the longitudinal direction. In addition, the aligner AN may be disposed in the chamber of the loader module LM.

The storage SR is connected to the loader module LM and is configured to store the substrate therein. The storage SR is disposed along the edge portion of the loader module LM along the longitudinal direction. The storage SR may be disposed along the edge portion of the loader module LM along the transverse direction. In addition, the storage SR may be provided inside the loader module LM.

Each of the load lock modules LL1 and LL2 is connected to the loader module LM and includes a preliminary decompression chamber. Each of the load lock modules LL1 and LL2 is disposed between the transfer module TM1 and the loader module LM. Each of the load lock modules LL1 and LL2 and the loader module LM are connected to each other via a gate valve G3. Each of the load lock modules LL1 and LL2 and the transfer module TM1 are connected to each other via a gate valve G2.

Each of the load lock modules LL1 and LL2 has a stage disposed in an internal space thereof. A pressure of the internal space can be reduced. The pressure of the internal space is set to an atmospheric pressure when the substrate W is transferred between the internal space and the loader module LM. The pressure of the internal space is reduced to, for example, a vacuum state when the substrate W is transferred between the internal space and the transfer module TM1.

Each of the transfer modules TM1 and TM2 includes a chamber. Each of the transfer modules TM1 and TM2 is configured to transfer the substrate through a decompressed space in the chamber. The chamber of the transfer module TM1 is connected to each of the load lock modules LL1 and LL2 via the gate valve G2. The process modules PM1 to PM6 are connected to the chamber of the transfer module TM1 via gate valves G1. The chamber of the transfer module TM1 is connected to the chamber of the transfer module TM2. The process modules PM7 to PM12 are connected to the chamber of the transfer module TM2 via the gate valves G1.

The transfer module TM1 includes a transfer robot TR1 provided in the chamber of the transfer module TM1. The transfer robot TR1 has, for example, end effectors EE11 and EE12 and articulated arms AR11 and AR12. The end effector EE11 has a fork FK11. The end effector EE12 has a fork FK12. The fork FK11 is attached to a distal end of the articulated arm AR11 and is configured to support the substrate placed thereon. The fork FK12 is attached to a distal end of the articulated arm AR12 and is configured to support the substrate placed thereon. The transfer robot TR1 transfers the substrate based on an operation instruction output by a controller 92 of the control device CU described later. The transfer robot TR1 holds the substrate with the forks FK11 and FK12. The transfer robot TR1 transfers the substrate between any two of the load lock modules LL1 and LL2, the process modules PM1 to PM6, the chamber of the transfer module TM1, and a path between the chamber of the transfer module TM1 and the chamber of the transfer module TM2.

The transfer module TM2 includes a transfer robot TR2 provided in the chamber thereof. The transfer robot TR2 has, for example, end effectors EE21 and EE22 and articulated arms AR21 and AR22. The end effector EE21 has a fork FK21. The end effector EE22 has a fork FK22. The fork FK21 is attached to a distal end of the articulated arm AR21 and is configured to support the substrate placed thereon. The fork FK22 is attached to a distal end of the articulated arm AR22 and is configured to support the substrate placed thereon. The transfer robot TR2 transfers the substrate based on the operation instruction output by the controller 92 of the control device CU described later. The transfer robot TR2 holds the substrate with the forks FK21 and FK22. The transfer robot TR2 transfers the substrate between any two of the process modules PM7 to PM12 and the path described above.

Each of the process modules PM1 to PM12 is a substrate processing apparatus configured to perform dedicated processing on the substrate. At least one of the process modules PM1 to PM12 may be a plasma processing apparatus. The transfer modules TM1 and TM2 and the process modules PM1 to PM12 are partitioned by the gate valves G1 that are openable and closable.

The cleaning station CL is configured to clean at least one support member (to be described later) of the transfer robot TR3. In the example illustrated in FIG. 2, the cleaning station CL is disposed along the other, in which the aligner AN is not provided, of the pair of the edge portions of the loader module LM along the transverse direction. The cleaning station CL is connected to the chamber of the loader module LM. The detailed descriptions of the cleaning station CL will be described later.

The control device CU is, for example, a computer. The control device CU includes a central processing unit (CPU), a random access memory (RAM), a read only memory (ROM), an auxiliary storage device, and the like. The CPU operates based on a program stored in the ROM or the auxiliary storage device to control each part of the processing system PS. For example, the control device CU outputs the operation instruction to the transfer robots TR1, TR2, and TR3, and the like. The operation instruction includes an instruction to move the forks FK11, FK12, FK21, FK22, and FK31 that transfer the substrate to a transfer location of the substrate.

The processing system PS is not necessarily limited to the one illustrated in FIG. 2. For example, the number of process modules and/or the number of forks in the processing system may be different from those illustrated in FIG. 2. In addition, the processing system may be a system (so-called loader type system) in which a plurality of module groups, each of which includes a process module and a load lock module, are connected to a loader module. In addition, the processing system may be a system (so-called cluster type system) in which two or more process modules are arranged and connected around a transfer module to surround the transfer module.

Hereinafter, details of each configuration of the processing system according to the exemplary embodiment will be described. First, the details of each configuration in the aligner AN will be described with reference to FIG. 1 again. The aligner AN is provided with an optical sensor SN, the substrate placing stage 10, and at least one measurer 20.

In the aligner AN, the substrate placing stage 10 has a placing surface 11. The substrate placing stage 10 supports the substrate W placed on the placing surface 11. The placing surface 11 may be configured of several pads. The substrate placing stage 10 of the aligner AN is rotatable.

The optical sensor SN of the aligner AN detects an angular position of the substrate W on the substrate placing stage 10 and a center position of the substrate W on the substrate placing stage 10. The optical sensor SN detects the angular position of the substrate W by detecting, for example, a marker such as a notch while rotating the substrate W on the placing surface 11 together with the substrate placing stage 10. The control device CU calculates an amount of deviation between a reference angular position and the angular position of the substrate W. The angular position of the notch of the substrate W is an example of a position of the substrate W. The reference angular position is an example of a reference position. The control device CU rotates the substrate placing stage 10 by the calculated amount of deviation. Accordingly, the control device CU cause the angular position of the substrate W to coincide with the reference angular position.

In addition, the optical sensor SN detects an edge of the substrate W while rotating the substrate W on the placing surface 11 together with the substrate placing stage 10. The control device CU determines the center position of the substrate W based on an edge detection result. The transfer robot TR3 controls the position of the end effector EE31 such that the determined center position of the substrate W and the reference position on the end effector EE31 coincide with each other when the substrate W is received from the substrate placing stage 10 to the end effector EE31. As a result, the position of the substrate W on the end effector EE31 is corrected.

The processing system PS may include three or more measurers 20 as the at least one measurer 20. As illustrated in FIG. 1, the processing system PS may include three measurers 20*a*, 20*b*, and 20*c* as the at least one measurer 20. Each of the three measurers 20*a*, 20*b*, and 20*c* is, for example, a force gauge. The measurers 20*a*, 20*b*, and 20*c* include contact portions 21*a*, 21*b*, and 21*c* disposed to be contactable with the substrate W, respectively. The measurers 20*a*, 20*b*, and 20*c* are configured to measure loads applied to the contact portions 21*a*, 21*b*, and 21*c*, respectively. The contact portions 21*a*, 21*b*, and 21*c* may be provided at upper ends of the three measurers 20*a*, 20*b*, and 20*c*, respectively. The three contact portions 21*a*, 21*b*, and 21*c* may be provided along the placing surface 11 of the substrate placing stage 10, and may not be provided on a straight line with respect to each other. Upper end surfaces of the three contact portions 21*a*, 21*b*, and 21*c* may be provided to be located in a plane including the placing surface 11. For example, the three contact portions 21*a*, 21*b*, and 21*c* may be arranged at equal intervals on a circumference centered on a reference position in the plane including the placing surface 11. Here, the reference position is, for example, a position where the center of the substrate W is disposed.

Figure 3:
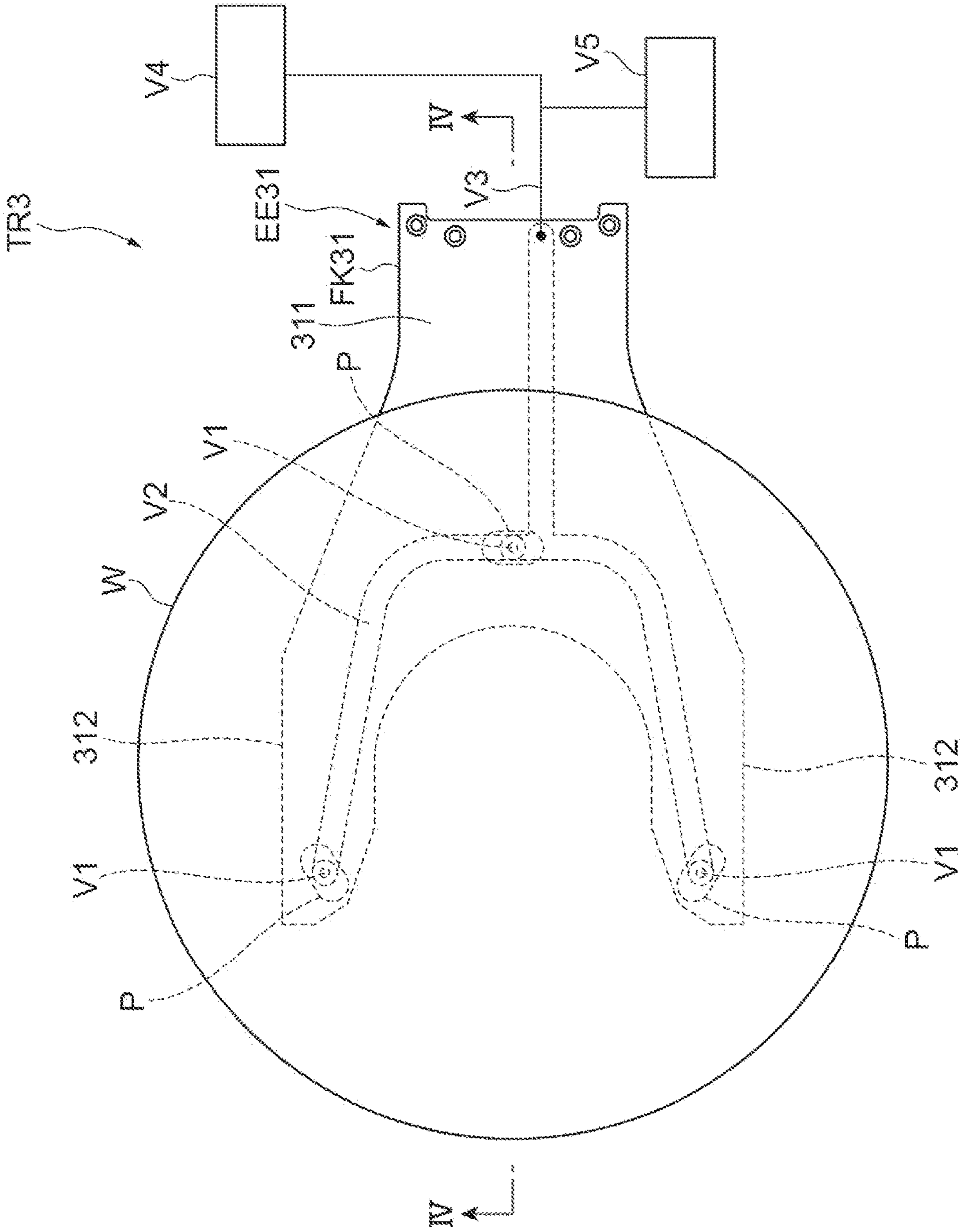
FIG. 3 is a top view illustrating a transfer device of the processing system according to the example.
Figure 4:
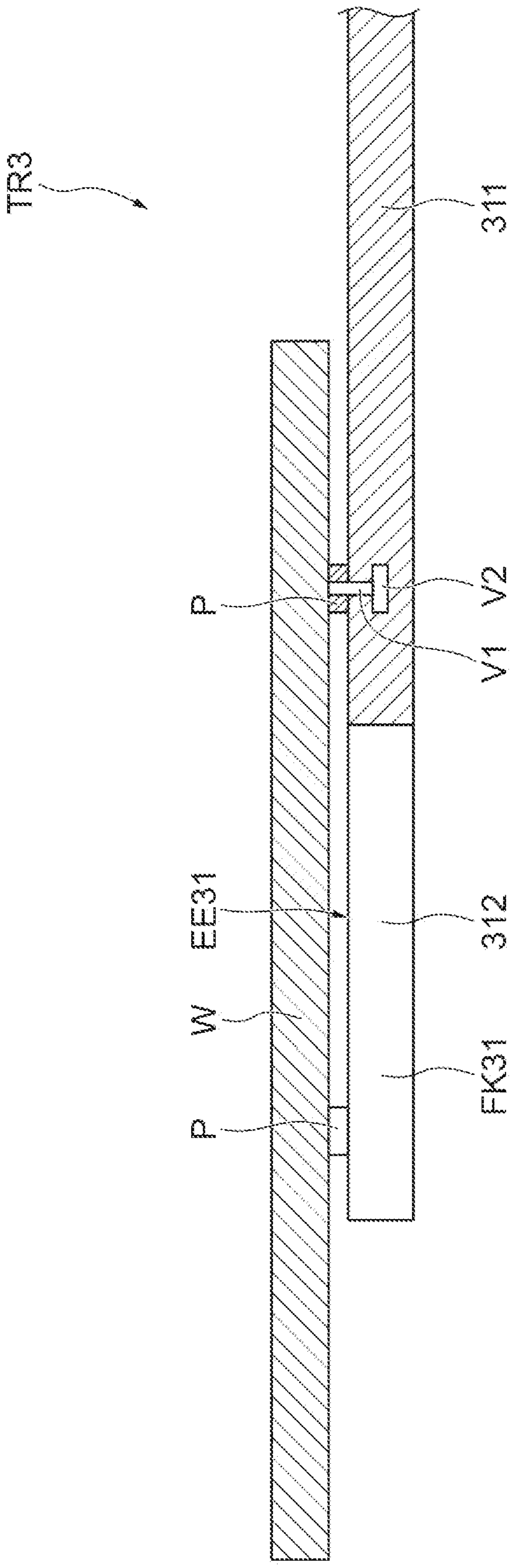
FIG. 4 is a cross-sectional view of the transfer device and a substrate taken along the line IV-IV in FIG. 3.

Hereinafter, the transfer robot TR3 that transfers the substrate W to the substrate placing stage 10 will be described with reference to FIGS. 3 and 4. FIG. 3 is a top view illustrating a transfer device of the processing system according to the exemplary embodiment. FIG. 4 is a cross-sectional view of the transfer device and the substrate taken along the line IV-IV in FIG. 3.

The end effector EE31 of the transfer robot TR3 includes a fork FK31 and at least one support member P. The at least one support member P is disposed such that the substrate W is placed thereon. The fork FK31 has a base end portion 311 and a pair of arm portions 312 and 312. The pair of arm portions 312 and 312 are spaced apart from each other and extend from the base end portion 311 to distal ends thereof. That is, the fork FK31 has a substantially U shape or a horseshoe shape. A width of a gap between the arm portion 312 and the arm portion 312 is larger than a width of the substrate placing stage 10 such that the pair of arm portions 312 and 312 do not come into contact with the substrate placing stage 10 when the end effector EE31 moves up and down.

As illustrated in FIGS. 3 and 4, the end effector EE31 may include three support members P as the at least one support member P. The three support members P are provided on the fork FK31. The three support members P are, for example, suction pads. Each of the three support members P includes an intake hole V1. Each intake hole V1 penetrates each support member P in an up-down direction. The three support members P are configured to suck the substrate W by intake of air from the intake hole V1 of each of the support members P. The intake hole V1 of each of the three support members P extends into the fork FK31.

The fork FK31 includes a suction passage V2 formed inside the fork FK31. The intake hole V1 of each of the three support members P is connected to the suction passage V2.

The processing system PS may further include an exhaust pipe V3, an exhaust device V4, and a suction sensor V5. A plurality of the intake holes V1 are connected to the exhaust device V4 via the suction passage V2 and the exhaust pipe V3. The exhaust device V4 includes a valve, a regulator, a vacuum pump, and the like. The exhaust device V4 suctions the inside of each of the intake hole V1, the suction passage V2, and the exhaust pipe V3 while adjusting the pressure in each of the intake hole V1, the suction passage V2, and the exhaust pipe V3. The intake hole V1 is also connected to the suction sensor V5 via the suction passage V2 and the exhaust pipe V3. The suction sensor V5 detects a pressure (hereinafter, also referred to as a "suction force") in the exhaust pipe V3 and notifies the control device CU of the detected pressure.

Figure 5:
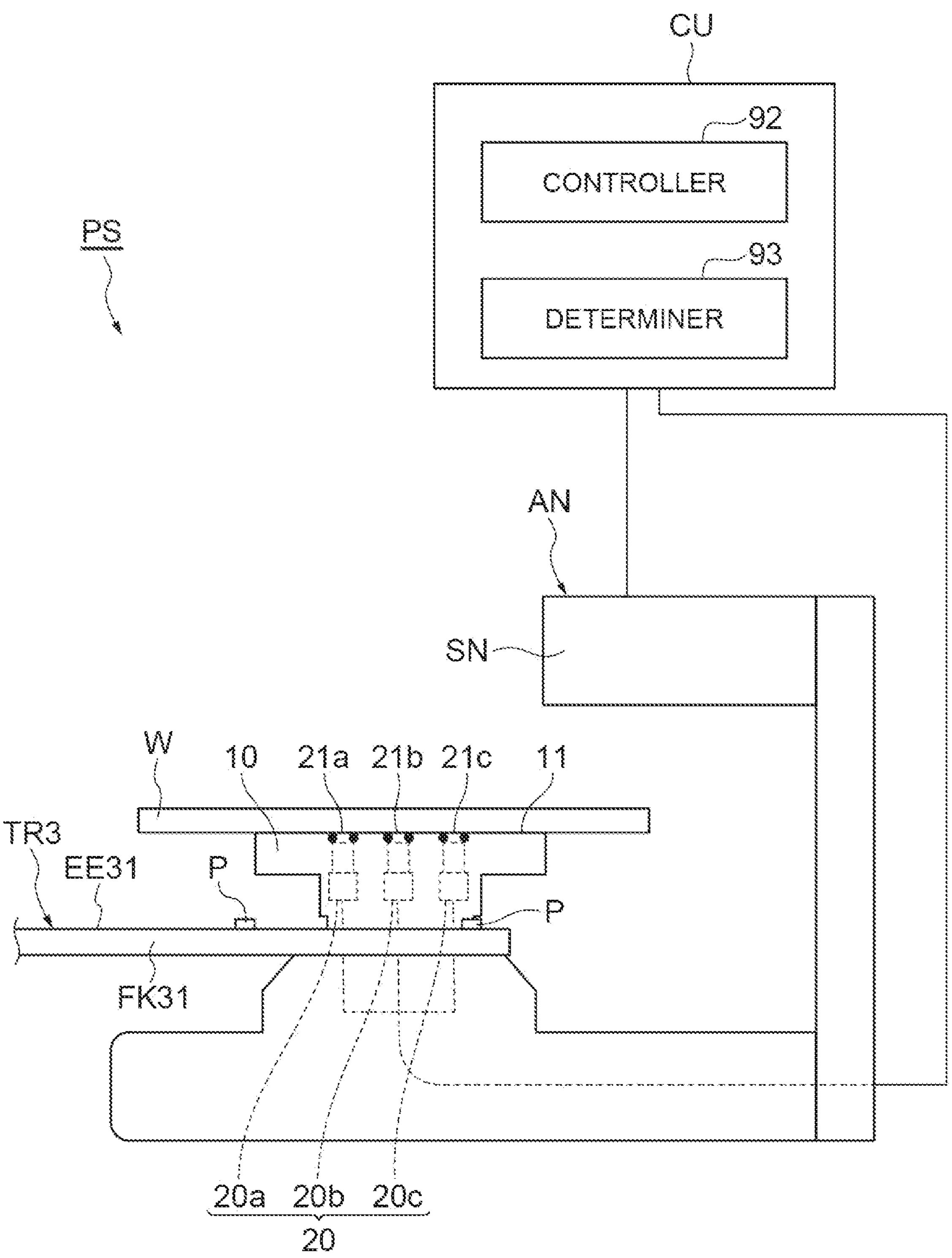
FIG. 5 is a side view illustrating the processing system according to the example.

Hereinafter, a flow of processing until the control device CU determines a suitability of a fixed state of the substrate W to the transfer robot TR3 will be described. As illustrated in FIGS. 1 and 5, the control device CU includes a determiner 93. The control device CU may include the controller 92.

The controller 92 controls the transfer robot TR3 to transfer the substrate W to the substrate placing stage 10 of the aligner AN. Hereinafter, a flow of a procedure in which the substrate W is delivered from the transfer robot TR3 to the substrate placing stage 10 will be described. The controller 92 controls the transfer robot TR3 to transfer the substrate W to a region above the substrate placing stage 10 of the aligner AN in a state in which the substrate W is placed on the three support members P of the end effector EE31. Next, as illustrated in FIG. 1, the controller 92 controls the transfer robot TR3 to lower the end effector EE31 that has reached the region above the substrate placing stage 10 toward a region below the placing surface 11 of the substrate placing stage 10. FIG. 5 is a side view illustrating the processing system according to the exemplary embodiment. As illustrated in FIG. 5, the end effector EE31 is lowered, so that the substrate W is placed on the placing surface 11, and the end effector EE31 is separated downward from the substrate W. Accordingly, the substrate W is delivered from the transfer robot TR3 to the substrate placing stage 10.

In a case where the substrate W is delivered from the substrate placing stage 10 to the end effector EE31, the controller 92 controls the transfer robot TR3 to raise the end effector EE31 upward from the region below the placing surface 11 of the substrate placing stage 10. Accordingly, the end effector EE31 supports the substrate W on the three support members P and lifts the substrate W from the placing surface 11 of the substrate placing stage 10. The transfer robot TR3 lifts the substrate W from the placing surface 11 of the substrate placing stage 10 and then transfers the substrate W.

When the substrate W is delivered from the transfer robot TR3 to the substrate placing stage 10, the contact portions 21*a*, 21*b*, and 21*c* of the three measurers 20*a*, 20*b*, and 20*c* come into contact with the substrate W. The three measurers 20*a*, 20*b*, and 20*c* measure a load applied to the substrate placing stage 10 from the substrate W when the substrate W is placed on the substrate placing stage 10 from the transfer robot TR3. Each of the three measurers 20*a*, 20*b*, and 20*c* notifies the determiner 93 of the control device CU of the measured load.

The determiner 93 determines a suitability of a fixed state of the substrate W to the transfer robot TR3 based on the load notified from each of the three measurers 20*a*, 20*b*, and 20*c*. As an example of determining the suitability of the fixed state, the determiner 93 may determine whether or not a fixing force of the substrate W to the transfer robot TR3 is abnormal. Hereinafter, an example in which the determiner 93 determines the suitability of the fixed state by comparing the fixing force of the substrate W to the transfer robot TR3, which is identified based on the load, with a threshold value will be described. First, the determiner 93 calculates the fixing force. The fixing force is a fixing force of the substrate W to the three support members P of the transfer robot TR3. The fixing force is calculated based on a difference between a maximum value of a total value of the loads and a total value of weights of the substrate W, which are measured by the three measurers 20*a*, 20*b*, and 20*c*. In an example, the fixing force is a difference between the maximum value of the total value of the loads and the total value of the weights of the substrate W, which are measured by the three measurers 20*a*, 20*b*, and 20*c*.

Specifically, the determiner 93 obtains the total value of the loads measured by the three measurers 20*a*, 20*b*, and 20*c* at each of a plurality of measurement points in time. Accordingly, the determiner 93 obtains the total value of the loads at each of the plurality of measurement points in time, that is, a plurality of the total values. The controller specifies the maximum value among the plurality of total values as the maximum value of the total value of the loads measured by the three measurers 20*a*, 20*b*, and 20*c*. The plurality of measurement points in time may be included in, for example, a period from a point in time when the end effector EE31 is located in the region above the placing surface 11 to a point in time when the end effector EE31 completes descent to the region below the placing surface.

The total value of the weights of the substrates W refers to, for example, the total value of the weights of the substrate W on the substrate placing stage 10 measured by the three measurers 20*a*, 20*b*, and 20*c* after the substrate W is delivered from the end effector EE31 to the substrate placing stage 10. The total value of the weights of the substrate W may be a minimum value of the total values of the weights of the substrate W on the substrate placing stage 10 measured by the three measurers 20*a*, 20*b*, and 20*c* at each of a plurality of points in time after the substrate W is delivered from the end effector EE31 to the substrate placing stage 10.

The determiner 93 determines whether or not the calculated fixing force is abnormal. The determiner 93 detects the abnormality by comparing the fixing force with the threshold value. The threshold value is set in advance. In a case where the fixing force is greater than the threshold value, the determiner 93 determines that the fixed state of the substrate W to the transfer robot TR3 is not suitable and determines that the fixing force is abnormal. Here, in a case where the three support members P supporting the substrate W are normal, it is determined that the fixed state of the substrate W to the transfer robot TR3 is suitable, and the fixing force is equal to or less than the threshold value. That is, the difference between the load applied from the substrate W and the weight of the substrate W falls within the threshold value.

However, in a case where at least one support member P supporting the substrate W is soiled for some reason, there is a possibility that the substrate W is fixed to the at least one support member P during transfer of the substrate W by the transfer robot TR3. In this case, the substrate W is less likely to be detached from the at least one support member P due to a high fixing force. When the substrate W is placed on the placing surface 11 of the substrate placing stage 10, the end effector EE31 of the transfer robot TR3 needs to move downward with a force exceeding the fixing force in order to detach the substrate W from the at least one support member P. In this case, the load measured by the three measurers 20*a*, 20*b*, and 20*c* is larger than a value obtained by adding the threshold value to the weight of the substrate W, by the fixing force. Therefore, in a case where the fixing force is greater than the threshold value, it is determined that at least one support member P of the end effector EE31 of the transfer robot TR3 is abnormal.

In an embodiment, the controller 92 may issue a warning in a case where it is determined that the fixing force calculated by the determiner 93 is greater than the threshold value. For example, the controller 92 reports the abnormality by voice notification by a buzzer (not illustrated), screen display on a display unit, and the like.

In an embodiment, the control device CU may move the end effector EE31 to the cleaning station CL to clean the three support members P in a case where the calculated fixing force is greater than the threshold value. The cleaning station CL performs, for example, air blowing, polishing, or both the air blowing and the polishing on at least one support member P.

The controller 92 may control the transfer robot TR3 to receive the substrate W from the substrate placing stage 10 and continue the transfer of the substrate W in a case where it is determined that the fixing force calculated by the determiner 93 is equal to or smaller than the threshold value. The controller 92 may continue the transfer of the substrate W even in a case where it is determined that the fixing force calculated by the determiner 93 is greater than the threshold value. In this case, the controller controls the transfer robot TR3 to receive the substrate W from the substrate placing stage 10 after moving the end effector EE31 to the cleaning station CL to clean at least one support member P, and then continue the transfer of the substrate W.

Figure 6:
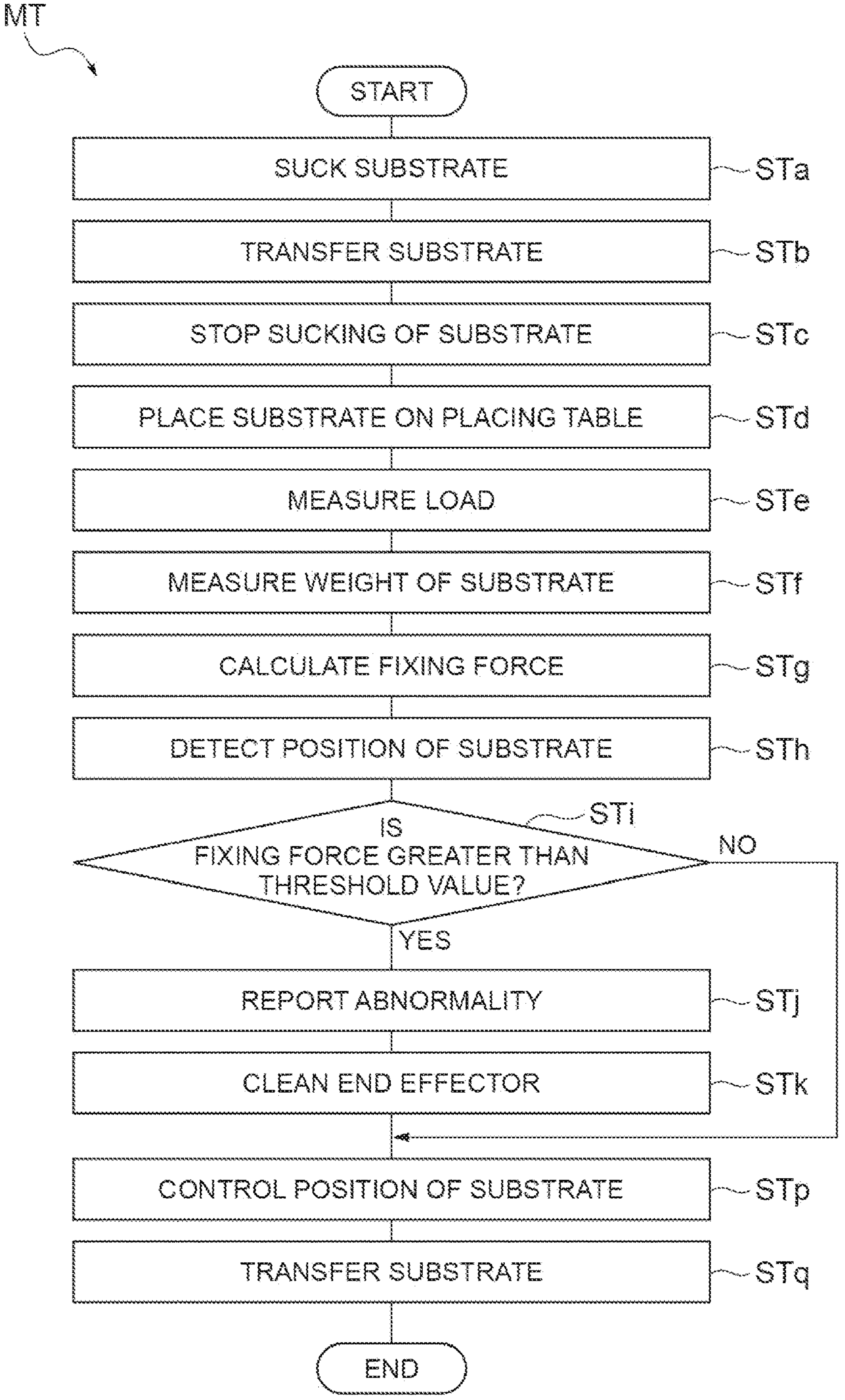
FIG. 6 is a flowchart of a transfer method according to the example.

Next, a transfer method performed in the processing system according to the exemplary embodiment will be described with reference to FIG. 6. FIG. 6 is a flowchart of the transfer method by the processing system according to the exemplary embodiment. Hereinafter, a transfer method MT (hereinafter, referred to as a "method MT") illustrated in FIG. 6 will be described by taking a case where the processing system PS is used as an example. In addition, each configuration and each control of the processing system PS by the control device CU in the method MT will be described. The method MT may be performed using a processing system other than the processing system PS.

In the method MT, when the substrate W is placed on the substrate placing stage 10 from the transfer robot TR3, the load applied to the substrate placing stage 10 from the substrate W is measured, and based on the measured load, it is determined whether or not the fixing force of the substrate W to the transfer robot TR3 is abnormal.

The method MT includes step STa. In step STa, the substrate W is sucked to the three support members P of the end effector EE31. When the substrate W is transferred by the transfer robot TR3, the controller 92 controls the exhaust device V4 such that the inside of each of the intake hole V1, the suction passage V2, and the exhaust pipe V3 is suctioned. Accordingly, the substrate W is sucked to the three support members P.

In the method MT, step STb is subsequently performed. In step STb, the substrate W is transferred to the substrate placing stage 10 by the transfer robot TR3. In step STa, for example, the controller 92 controls the transfer robot TR3 to transfer the substrate W to the aligner AN. When the substrate W is transferred by the transfer robot TR3, the substrate W is placed on the three support members P of the end effector EE31.

In the method MT, step STc is subsequently performed. In step STc, the sucking of the substrate W to the end effector EE31 is stopped. When the end effector EE31 on which the substrate W is placed has moved above the substrate placing stage 10, the controller 92 controls the exhaust device V4 to stop the suctioning of the inside of each of the intake hole V1, the suction passage V2, and the exhaust pipe V3. Accordingly, the sucking between the substrate W and the three support members P is stopped.

In the method MT, step STd is subsequently performed. In step STd, the substrate W is placed on the substrate placing stage 10. Specifically, the controller 92 controls the transfer robot TR3 such that the end effector EE31 moves to the region below the placing surface 11. Accordingly, the substrate W is delivered from the end effector EE31 to the substrate placing stage 10 and is transferred onto the substrate placing stage 10.

In addition, in the method MT, step STe is performed. In step STe, the load applied to the substrate placing stage 10 from the substrate W when the substrate W is placed on the substrate placing stage 10 from the transfer robot TR3 is measured. Each of the three measurers 20*a*, 20*b*, and 20*c* measures the load applied from the substrate W at each of the plurality of measurement points in time. Each of the three measurers 20*a*, 20*b*, and 20*c* notifies the determiner 93 of the load measured at each of the plurality of measurement points in time.

In addition, in the method MT, step STf is performed. In step STf, the weight of the substrate W is measured. For example, the substrate W is placed on the substrate placing stage 10 from the end effector EE31, the end effector EE31 is moved to the region below the placing surface 11, and then the weight of the substrate W on the substrate placing stage 10 is measured by each of the three measurers 20*a*, 20*b*, and 20*c*. Each of the three measurers 20*a*, 20*b*, and 20*c* notifies the determiner 93 of the measured weight of the substrate W.

In the method MT, step STg is subsequently performed. In step STg, the fixing force is calculated. The determiner 93 calculates the fixing force based on the loads measured by the three measurers 20*a*, 20*b*, and 20*c*. As described above, the fixing force is a difference between the maximum value of the total value of the loads measured by the three measurers 20*a*, 20*b*, and 20*c* at each of the plurality of measurement points in time and the total value of the weights measured by each of the three measurers 20*a*, 20*b*, and 20*c*.

In the method MT, step STh is subsequently performed. In step STh, a position of the substrate W in the aligner AN is detected. The optical sensor SN of the aligner AN detects the angular position of the notch of the substrate W as the position of the substrate W. The optical sensor SN notifies the determiner 93 of the detected angular position of the notch of the substrate W.

In the method MT, step STi is then performed. In step STi, the suitability of the fixed state of the substrate W to the transfer robot TR3 is determined. That is, in step STi, it is determined whether or not the fixing force of the substrate W to the transfer robot TR3 is abnormal. The determiner 93 detects the abnormality by comparing the fixing force with the threshold value. In a case where the fixing force is equal to or smaller than the threshold value, it is determined that the fixed state of the substrate W to the transfer robot TR3 is suitable. That is, in a case where the fixing force is equal to or smaller than the threshold value, it is determined that the fixing force of the substrate W to the transfer robot TR3 is not abnormal, and the process proceeds to step STp. On the other hand, in a case where the fixing force is greater than the threshold value, it is determined that the fixed state of the substrate W to the transfer robot TR3 is not suitable. That is, in a case where the fixing force is equal to or smaller than the threshold value, it is determined that the fixing force of the substrate W to the transfer robot TR3 is abnormal, and the process proceeds to step STj.

In step STj, the abnormality is reported. The controller 92 is configured to issue a warning by voice notification by a buzzer (not illustrated), screen display on a display unit, and the like.

In the method MT, step STk is performed after step STj. In step STk, the end effector EE31 moves to the cleaning station CL. At least one support member P of the end effector EE31 is cleaned by executing air blowing, polishing, or both the air blowing and the polishing. For example, the three support members P of the end effector EE31 may be cleaned by executing air blowing, polishing, or both the air blowing and the polishing. Then, the process proceeds to step STp.

In step STp, based on a detection result of the angular position of the substrate W on the substrate placing stage 10 by the optical sensor SN, the controller 92 causes the angular position to coincide with the reference angular position. In addition, in step STp, the controller 92 determines the center position of the substrate W on the substrate placing stage 10 based on the edge detection result by the optical sensor SN. Accordingly, the transfer robot TR3 can control the position of the end effector EE31 such that the determined center position of the substrate W and the reference position on the end effector EE31 coincide with each other when the substrate W is received from the substrate placing stage 10 to the end effector EE31.

In the method MT, step STq is subsequently performed. In step STq, in the aligner AN, the substrate W is received from the substrate placing stage 10 by the end effector EE31, and the transfer of the substrate W is continued. In a case where the substrate W is received from the substrate placing stage 10 by the end effectors EE31, the method MT ends.

According to the processing system PS of the embodiment, it is possible to determine the suitability of the fixed state of the substrate W to the transfer robot TR3 based on the loads measured by the three measurers 20*a*, 20*b*, and 20*c* during the operation of delivering the substrate W from the end effector EE31 to the substrate placing stage 10. Specifically, according to the processing system PS, the fixing force that is an index of the fixed state of the substrate W to the transfer robot TR3 can be detected. Therefore, according to the processing system PS, it is possible to detect the abnormality in the fixing force of the substrate W to the transfer robot TR3. The transfer robot TR3 is an example of a transfer device.

In addition, in step STg, the fixing force is calculated based on the difference between the maximum value of the loads and the weight of the substrate W, which are measured by the three measurers 20*a*, 20*b*, and 20*c*. The three measurers 20*a*, 20*b*, and 20*c* can measure the load at a plurality of measurement points in time from the time when the substrate W comes into contact with the placing surface 11 of the substrate placing stage 10 to the time when the substrate W is detached from all the support members P in the end effector EE31 of the transfer robot TR3. The determiner 93 calculates the maximum value among the total values of the loads measured by the three measurers 20*a*, 20*b*, and 20*c* at each measurement point in time. By defining that the maximum fixing force is measured when calculating the fixing force, the accuracy of determination can be improved for each determination of abnormality of the fixing force.

In addition, in step STj, the controller 92 is configured to issue a warning in a case where the determiner 93 determines that the fixing force is greater than the threshold value. Accordingly, the processing system PS can appropriately make an operator or the like recognize that the state of the end effector EE31 is not suitable.

In addition, in step STk, in a case where the determiner 93 determines that the fixing force is greater than the threshold value, the controller 92 moves the end effector EE31 to the cleaning station CL to clean at least one support member P. Accordingly, the processing system PS can clean the support member P in which the abnormality in the fixing force is detected, and can suppress continuation of the abnormality in the fixing force.

In addition, in step STp, in a case where the determiner 93 determines that the fixing force is equal to or smaller than the threshold value, the controller 92 can control the transfer robot TR3 to receive the substrate W from the substrate placing stage 10 and continue the transfer of the substrate W. In a case where the fixing force is not abnormal, the controller 92 can cause the transfer robot TR3 to continue the transfer of the substrate W. In addition, in a case where the determiner 93 determines that the fixing force is greater than the threshold value, the controller 92 controls the transfer robot TR3 to clean at least one support member P by the cleaning station CL. After at least one support member P is cleaned, in step STp, the controller 92 can control the transfer robot TR3 to receive the substrate W from the substrate placing stage 10 and continue the transfer of the substrate W. Even when the fixing force is abnormal, the support member P is cleaned and the abnormality of the fixing force is eliminated. Therefore, the controller 92 can cause the transfer robot TR3 to continue the transfer of the substrate W.

As an example, in a case where the determiner 93 determines that the fixing force is abnormal, the determiner 93 may detect in which support member P among the three support members P the fixing force is abnormal. The determiner 93 acquires the loads measured by each of the three measurers 20*a*, 20*b*, and 20*c* at the measurement point in time when the total value of the loads is the maximum value. The determiner 93 detects that the fixing force in the support member P closest to the measurer in which the largest load among the measured three loads is measured is abnormal.

As described above, the processing system PS includes the three measurers 20*a*, 20*b*, and 20*c* that are provided along the placing surface 11 of the substrate placing stage 10 on which the substrate W is placed and are not provided on a straight line with respect to each other, as the at least one measurer 20. Accordingly, it is possible to detect the abnormality of the fixing force in a planar manner, and it is possible to appropriately detect the abnormal portion (support member P). In this case, for example, the controller 92 may issue a warning such that the support member P in which the fixing force is abnormal among the three support members P can be identified. In addition, the controller 92 may move the end effector EE31 to the cleaning station CL to clean at least the support member P in which the fixing force is abnormal.

The threshold value for the fixing force between the substrate W and the support member P may be set for each measurer. The three measurers 20*a*, 20*b*, and 20*c* may not be provided at equal intervals on the circumference centered on the reference position of the placing surface 11. In step STi, it may be determined whether or not the fixing force for each measurer is abnormal by comparing the fixing force for each measurer with the threshold value set for each measurer. In this case, in step STg, the fixing force for each measurer may be calculated based on the load of the substrate W and the weight of the substrate W, which are measured for each measurer. For example, in step STi, in a case where at least one fixing force is greater than a corresponding threshold value, it may be determined that the fixing force is abnormal.

The number of the measurers 20 in the processing system PS is not limited to three. The processing system PS may include one measurer 20, or may include two or four or more measurers 20. The number of the support members P of the end effector EE31 is not limited. The end effector EE31 may have one support member P, or may have two or four or more support members P. In addition, the intake hole V1 may not be formed in at least one support member P. The processing system PS may not include the cleaning station CL. In this case, step STp and step STq are not executed.

Figure 7:
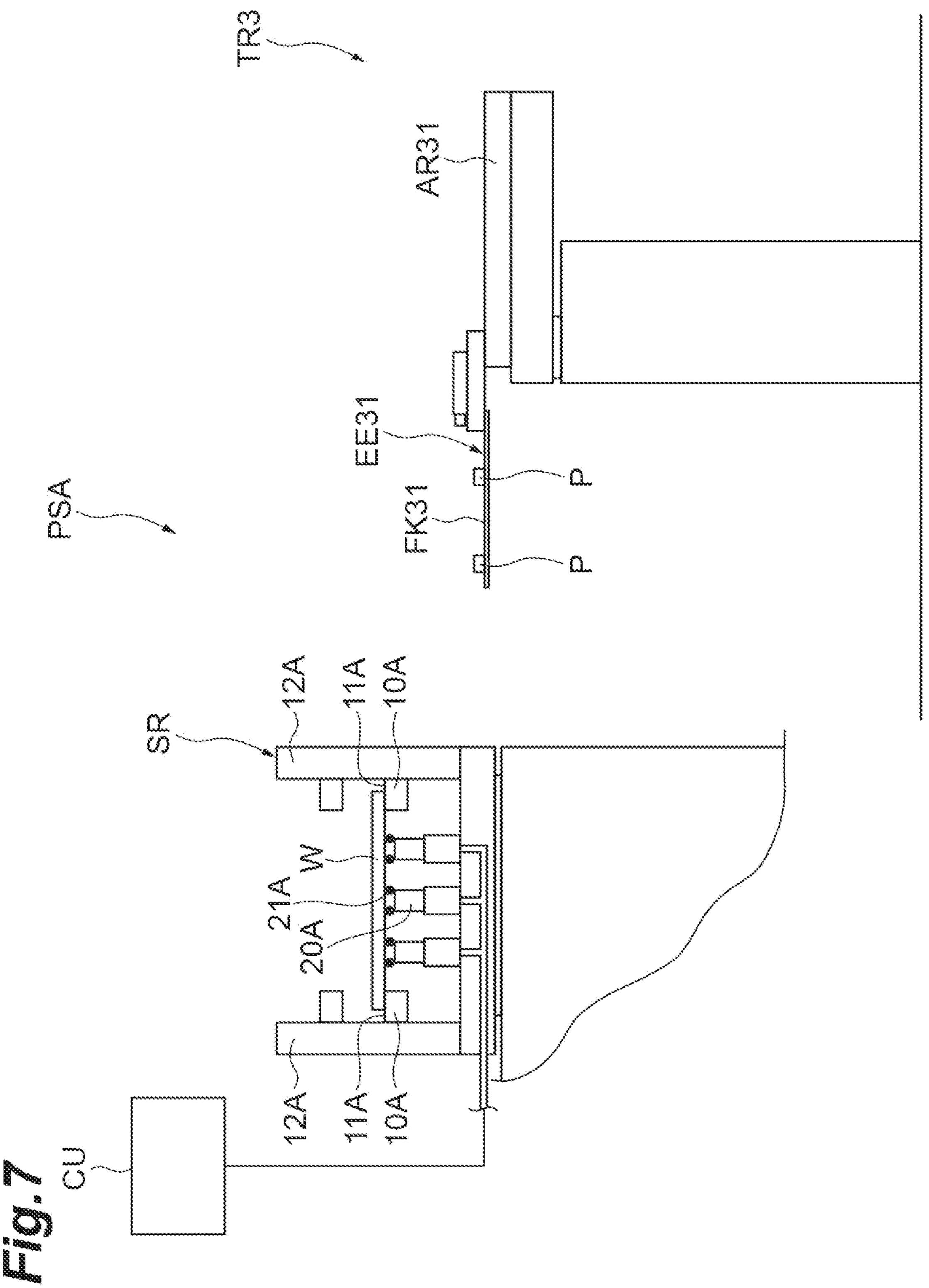
FIG. 7 is a side view illustrating a processing system according to another example.

Hereinafter, another processing system will be described with reference to FIG. 7. FIG. 7 is a diagram for describing a processing system according to another exemplary embodiment. FIG. 7 illustrates a state after the substrate W is placed on a substrate placing stage 10A of the storage SR by the transfer robot TR3. In FIG. 7, an orientation of the end effector EE31 with respect to an opening of the storage SR is changed by the articulated arm AR31. A processing system PSA according to the exemplary embodiment illustrated in FIG. 7 is different from the processing system PS in that the substrate placing stage and at least one measurer are in the storage SR.

The storage SR has a pair of substrate placing stages 10A and 10A and a pair of wall parts 12A and 12A. The pair of wall parts 12A and 12A are walls that are substantially parallel to each other and extend in a vertical direction, and are separated from each other. The pair of substrate placing stages 10A and 10A extend from the pair of wall parts 12A and 12A to a space between the pair of wall parts 12A and 12A. The pair of substrate placing stages 10A and 10A are separated from each other. The pair of substrate placing stages 10A and 10A support the substrate W placed thereon. The pair of substrate placing stages 10A and 10A have placing surfaces 11A and 11A on which the substrate W is placed. The fork FK31 of the end effector EE31 has, for example, a width smaller than a width of a region between the pair of substrate placing stages 10A and 10A to be able to move up and down through the region between the pair of substrate placing stages 10A and 10A.

The transfer robot TR3 lowers the end effector EE31 from a region above the pair of placing surfaces 11A and 11A of the pair of substrate placing stages 10A and 10A to deliver the substrate W from the end effector EE31 to the pair of substrate placing stages 10A and 10A. Accordingly, the substrate W is separated from the end effector EE31 and is placed on the pair of placing surfaces 11A and 11A. In addition, the transfer robot TR3 raises the end effector EE31 from a region below the pair of substrate placing stages 10A and 10A. Accordingly, the end effector EE31 supports the substrate W with the three support members P and lifts the substrate W from the pair of placing surfaces 11A and 11A of the pair of substrate placing stages 10A and 10A.

The processing system PSA includes three measurers 20A as at least one measurer. Each measurer 20A includes a contact portion 21A disposed to be contactable with the substrate W. Each contact portion 21A is provided, for example, at an upper end of each measurer 20A. Each contact portion 21A is provided along a plane including the placing surface 11A of the substrate placing stage 10A. An upper end surface of each contact portion 21A is provided to be located on the plane including the placing surface 11A. A transfer method by the processing system PSA is the same as the method MT of the processing system PS in the above-described embodiment. The transfer method by the processing system PSA may not include step STp.

Figure 8:
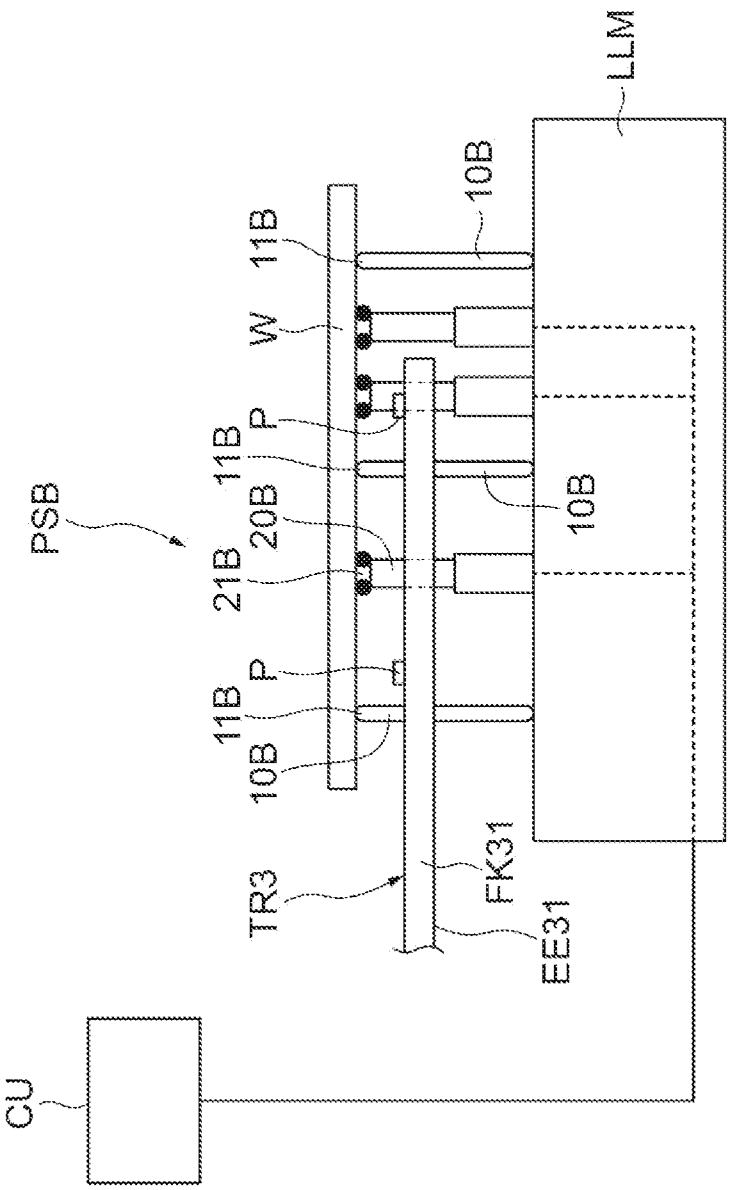
FIG. 8 is a side view illustrating a processing system according to still another example.

Hereinafter, still another processing system will be described with reference to FIG. 8. FIG. 8 is a diagram for describing a processing system according to still another exemplary embodiment. FIG. 8 illustrates a state after the substrate W is placed on a load lock module LLM by the transfer robot TR3. A processing system PSB according to the exemplary embodiment illustrated in FIG. 8 is different from the processing system PS in that a substrate placing stage and at least one measurer are in the load lock module LLM.

The load lock module LLM has three substrate placing stages 10B as the substrate placing stage. The three substrate placing stages 10B support the substrate W placed thereon. Each of the three substrate placing stages 10B has a placing surface 11B on which the substrate W is placed. As illustrated in FIG. 8, the three substrate placing stages 10B may be vertically movable pins extending parallel to each other, and upper end surfaces thereof may be the placing surfaces 11B.

The transfer robot TR3 lowers the end effector EE31 from a region above the placing surface 11B of each of the three substrate placing stages 10B. Accordingly, the substrate W is delivered from the end effector EE31 to the three substrate placing stages 10B and is placed on three placing surfaces 11B. In addition, the transfer robot TR3 raises the end effector EE31 from a region below the placing surfaces 11B of each of the three substrate placing stages 10B. Accordingly, the end effector EE31 supports the substrate W with the three support members P and lifts the substrate W from the placing surface 11B of each of the substrate placing stages 10B.

The processing system PSB includes three measurers 20B as at least one measurer. Each measurer 20B includes a contact portion 21B disposed to be contactable with the substrate W. Each contact portion 21B is provided, for example, at an upper end of the measurer 20B. Each contact portion 21B is provided along the placing surface 11B of the substrate placing stage 10B. An upper end surface of each contact portion 21B is provided, for example, to be located in a plane including the placing surface 11B. A transfer method by the processing system PSB is the same as the method MT of the processing system PS in the above-described embodiment. The transfer method by the processing system PSB may not include step STp.

It should be understood that the embodiments described above are provided for mere illustrative purposes and can be modified within the scope of the invention. The embodiments disclosed herein should not be construed to limit of the scope of the disclosure and the scope of the disclosure should be determined based on the description of the attached claims.

Here, the various exemplary embodiments included in the present disclosure are described in [E1] to [E19] below.

[E1]

A processing system comprising:

a substrate placing stage configured to place a substrate thereon;

at least one measurer configured to measure a load applied to the substrate from the substrate placing stage when the substrate is transferred from a transfer device to the substrate placing stage; and a determiner configured to determine a suitability of a fixed state of the substrate to the transfer device based on the load measured by the at least one measurer.

[E2]

The processing system according to E1, further comprising:

the transfer device configured to transfer the substrate to the substrate placing stage.

[E3]

The processing system according to E1 or E2, wherein the processing system includes three or more measurers each including a contact portion, as the at least one measurer, the three or more measurers are configured to measure loads on the contact portions thereof, and the contact portions of the three or more measurers are not disposed on a straight line.

[E4]

The processing system according to any one of E1 to E3, wherein the transfer device has an end effector including a fork and at least one support member configured to place the substrate thereon, and the fixed state is a fixed state of the substrate to the at least one support member.

[E5]

The processing system according to E4, wherein the at least one support member is configured to suck the substrate by intake of air from an intake hole thereof.

[E6]

The processing system according to E4 or E5, wherein the determiner is configured to determine the suitability of the fixed state by comparing a fixing force of the substrate to the transfer device, which is identified based on the load, with a threshold value.

[E7]

The processing system according to E6, wherein the fixing force is calculated based on a difference between a maximum value of the load measured by the at least one measurer and a weight of the substrate.

[E8]

The processing system according to E6 or E7, further comprising:

a cleaning station configured to clean the at least one support member; and a controller configured to control the transfer device, wherein the transfer device has an end effector including a fork and the at least one support member configured to place the substrate thereon, and the controller is configured to move the end effector to the cleaning station to clean the at least one support member in a case where the determiner determines that the fixing force is greater than the threshold value.

[E9]

The processing system according to any one of E1 to E3, wherein the determiner is configured to determine the suitability of the fixed state by comparing a fixing force of the substrate to the transfer device, which is identified based on the load, with a threshold value.

[E10]

The processing system according to E9, wherein the fixing force is calculated based on a difference between a maximum value of the load measured by the at least one measurer and a weight of the substrate.

[E11]

The processing system according to any one of E6 to E10, further comprising:

a controller is configured to issue a warning in a case where the determiner determines that the fixing force is greater than the threshold value.

[E12]

The processing system according to E6 or E10, further comprising:

a controller configured to control the transfer device, wherein the controller is configured to cause the transfer device to receive the substrate from the substrate placing stage and continue transfer of the substrate in a case where the determiner determines that the fixing force is equal to or smaller than the threshold value.

[E13]

The processing system according to any one of E1 to E3 and E5 to E12, further comprising:

a load port;

a loader module configured to transfer the substrate taken out from the load port in an atmospheric pressure environment and including the transfer device;

an aligner connected to the loader module and configured to adjust a position of the substrate;

a load lock module connected to the loader module and including a preliminary decompression chamber; and a storage connected to the loader module and configured to store the substrate therein, wherein the substrate placing stage and the at least one measurer are in the aligner.

[E14]

The processing system according to E4, further comprising:

a load port;

a loader module configured to transfer the substrate taken out from the load port in an atmospheric pressure environment and including the transfer device;

an aligner connected to the loader module and configured to adjust a position of the substrate;

a load lock module connected to the loader module and including a preliminary decompression chamber; and a storage connected to the loader module and configured to store the substrate therein, wherein the substrate placing stage and the at least one measurer are in the aligner.

[E15]

The processing system according to E14, further comprising:

a cleaning station configured to clean the at least one support member; and a controller configured to control the transfer device having an end effector including a fork and the at least one support member configured to place the substrate thereon, wherein the controller is configured to cause the transfer device to receive the substrate from the substrate placing stage and continue transfer of the substrate after cleaning the at least one support member in a case where the determiner determines that the fixed state is not suitable.

[E16]

The processing system according to any one of E1 to E3 and E5 to E14, further comprising:

a load port;

a loader module configured to transfer the substrate taken out from the load port in an atmospheric pressure environment and including the transfer device;

an aligner connected to the loader module and configured to adjust a position of the substrate;

a load lock module connected to the loader module and including a preliminary decompression chamber; and a storage connected to the loader module and configured to store the substrate therein, wherein the substrate placing stage and the at least one measurer are in the storage.

[E17]

The processing system according to any one of E1 to E3 and E5 to E14, further comprising:

a load port;

a loader module configured to transfer the substrate taken out from the load port in an atmospheric pressure environment and including the transfer device;

an aligner connected to the loader module and configured to adjust a position of the substrate;

a load lock module connected to the loader module and including a preliminary decompression chamber; and a storage connected to the loader module and configured to store the substrate therein, wherein the substrate placing stage and the at least one measurer are in the load lock module

[E18]

The processing system according to E4, further comprising:

a load port;

a loader module configured to transfer the substrate taken out from the load port in an atmospheric pressure environment and including the transfer device;

an aligner connected to the loader module and configured to adjust a position of the substrate;

a load lock module connected to the loader module and including a preliminary decompression chamber; and a storage connected to the loader module and configured to store the substrate therein, wherein the substrate placing stage and the at least one measurer are in the load lock module.

[E19]

The processing system according to E14, further comprising:

a cleaning station configured to clean the at least one support member; and a controller configured to control the transfer device having an end effector including a fork and the at least one support member configured to place the substrate thereon, wherein the controller is configured to cause the transfer device to receive the substrate from the substrate placing stage and continue transfer of the substrate after cleaning the at least one support member in a case where the determiner determines that the fixed state is not suitable.

What is claimed is:

1. A processing system comprising:

a substrate placing stage configured to place a substrate thereon;

at least one measurer configured to measure a load applied to the substrate from the substrate placing stage when the substrate is transferred from a transfer device to the substrate placing stage; and a determiner configured to determine a suitability of a fixed state of the substrate to the transfer device based on the load measured by the at least one measurer.

2. The processing system according to claim 1, further comprising:

the transfer device configured to transfer the substrate to the substrate placing stage.

3. The processing system according to claim 1, wherein the processing system includes three or more measurers as the at least one measurer, the three or more measurers including respective contact portions, the three or more measurers are configured to measure loads on the respective contact portions, and the contact portions of the three or more measurers are not disposed on a straight line.

4. The processing system according to claim 1, wherein the transfer device has an end effector including a fork and at least one support member configured to place the substrate thereon, and the fixed state is a fixed state of the substrate to the at least one support member.

5. The processing system according to claim 4, wherein the at least one support member is configured to suck the substrate by intake of air from an intake hole thereof.

6. The processing system according to claim 4, wherein the determiner is configured to determine the suitability of the fixed state by comparing a fixing force of the substrate to the transfer device, which is identified based on the load, with a threshold value.

7. The processing system according to claim 6, wherein the fixing force is calculated based on a difference between a maximum value of the load measured by the at least one measurer and a weight of the substrate.

8. The processing system according to claim 6, further comprising:

a cleaning station configured to clean the at least one support member; and a controller configured to control the transfer device, wherein the transfer device has an end effector including a fork and the at least one support member configured to place the substrate thereon, and the controller is configured to move the end effector to the cleaning station to clean the at least one support member in a case where the determiner determines that the fixing force is greater than the threshold value.

9. The processing system according to claim 6, further comprising:

a controller is configured to issue a warning in a case where the determiner determines that the fixing force is greater than the threshold value.

10. The processing system according to claim 6, further comprising:

a controller configured to control the transfer device, wherein the controller is configured to cause the transfer device to receive the substrate from the substrate placing stage and continue transfer of the substrate in a case where the determiner determines that the fixing force is equal to or smaller than the threshold value.

11. The processing system according to claim 4, further comprising:

a load port;

a loader module configured to transfer the substrate taken out from the load port in an atmospheric pressure environment and including the transfer device;

an aligner connected to the loader module and configured to adjust a position of the substrate;

a load lock module connected to the loader module and including a preliminary decompression chamber; and a storage connected to the loader module and configured to store the substrate therein, wherein the substrate placing stage and the at least one measurer are in the aligner.

12. The processing system according to claim 11, further comprising:

a cleaning station configured to clean the at least one support member; and a controller configured to control the transfer device having an end effector including a fork and the at least one support member configured to place the substrate thereon, wherein the controller is configured to cause the transfer device to receive the substrate from the substrate placing stage and continue transfer of the substrate after cleaning the at least one support member in a case where the determiner determines that the fixed state is not suitable.

13. The processing system according to claim 1, further comprising:

a load port;

a loader module configured to transfer the substrate taken out from the load port in an atmospheric pressure environment and including the transfer device;

an aligner connected to the loader module and configured to adjust a position of the substrate;

a load lock module connected to the loader module and including a preliminary decompression chamber; and a storage connected to the loader module and configured to store the substrate therein, wherein the substrate placing stage and the at least one measurer are in the storage.

14. The processing system according to claim 1, further comprising:

a load port;

a loader module configured to transfer the substrate taken out from the load port in an atmospheric pressure environment and including the transfer device;

an aligner connected to the loader module and configured to adjust a position of the substrate;

a load lock module connected to the loader module and including a preliminary decompression chamber; and a storage connected to the loader module and configured to store the substrate therein, wherein the substrate placing stage and the at least one measurer are in the load lock module.

* * * * *